(12) United States Patent
Tan et al.

(10) Patent No.: US 7,817,960 B2
(45) Date of Patent: Oct. 19, 2010

(54) WIRELESS AUDIO SHARING

(75) Inventors: Min-Liang Tan, Singapore (SG); Hoe Chan, Singapore (SG); Terence Tang, Singapore (SG)

(73) Assignee: Jook, Inc., Carlsbad, CA (US)

( * ) Notice: Subject to any disclaimer, the term of this patent is extended or adjusted under 35 U.S.C. 154(b) by 720 days.

(21) Appl. No.: 11/625,692

(22) Filed: Jan. 22, 2007

(65) Prior Publication Data
US 2008/0175403 A1    Jul. 24, 2008

(51) Int. Cl.
*H04B 7/15* (2006.01)
*H04K 3/00* (2006.01)

(52) U.S. Cl. .............. 455/11.1; 455/41.3; 381/79; 381/311

(58) Field of Classification Search ............ 455/11.1, 455/16–18, 41.2–41.3; 381/77, 79, 311
See application file for complete search history.

(56) References Cited

U.S. PATENT DOCUMENTS

| | | | |
|---|---|---|---|
| 3,676,781 A | 7/1972 | Worcester | |
| 4,607,395 A | 8/1986 | Sundahl | |
| 4,782,527 A | 11/1988 | Williamson | |
| 4,845,751 A | 7/1989 | Schwab | |
| 5,404,577 A | 4/1995 | Zuckerman | |
| 5,438,702 A | 8/1995 | Jackson | |
| 6,256,303 B1 * | 7/2001 | Drakoulis et al. ........... | 370/344 |
| 6,980,165 B2 | 12/2005 | Yuasa | |
| 6,987,947 B2 | 1/2006 | Richenstein | |
| 7,031,475 B2 | 4/2006 | Kuraoka | |
| 7,095,866 B1 | 8/2006 | Drakoulis | |
| 2001/0002928 A1 | 6/2001 | Cummins | |
| 2001/0031622 A1 | 10/2001 | Kivela | |
| 2002/0002035 A1 | 1/2002 | Sim | |
| 2002/0039424 A1 | 4/2002 | Watanuki | |
| 2003/0003871 A1 | 1/2003 | Urso | |
| 2003/0036360 A1 | 2/2003 | Russell | |
| 2003/0059071 A1 | 3/2003 | Dunham | |
| 2003/0100274 A1 | 5/2003 | Brown | |
| 2005/0094838 A1 | 5/2005 | Tomoda | |

(Continued)

FOREIGN PATENT DOCUMENTS

JP        2001-257620 A        9/2001

(Continued)

OTHER PUBLICATIONS

Electronics Information Online; Electronics Information Online Website: http://www.electronics-manufacturers.com/info/audio-electronics/bluetooth-headset.html Title: Bluetooth headset Date of Publication: Monday, Oct. 9, 2006.

(Continued)

*Primary Examiner*—Lee Nguyen
(74) *Attorney, Agent, or Firm*—Conley Rose, P.C.

(57) ABSTRACT

A system and method are disclosed for wireless sharing of audio sounds among a plurality of users with access to a dedicated, shared signal. A user of the present invention can communicate his or her audio sounds to other users, who can receive the audio sounds wirelessly and choose to rebroadcast them. As such, an audio sound sharing network can be readily established at any time and place among participants in the network.

73 Claims, 2 Drawing Sheets

U.S. PATENT DOCUMENTS

| | | |
|---|---|---|
| 2005/0232436 A1 | 10/2005 | Nagayasu |
| 2005/0281422 A1 | 12/2005 | Armstrong |
| 2006/0079213 A1 | 4/2006 | Herberger |

FOREIGN PATENT DOCUMENTS

| | | |
|---|---|---|
| JP | 2002-359623 A | 12/2002 |
| JP | 2003-000787 A | 1/2003 |
| JP | 2004-032087 A | 1/2004 |
| WO | WO2005-117483 A1 | 12/2005 |
| WO | WO2006-031809 A2 | 3/2006 |
| WO | WO2006-051505 A1 | 5/2006 |

OTHER PUBLICATIONS

Looking is Hearing Watanabe Junji ; Nii Hideaki Hashimoto Yuki; Inami Masahiro Graduate School of Information Sci. and Technol., Univ. Tokyo, JPN; Univ. Electro-Communications, Graduate School of Electro-Communications, JPN; Univ. of Electro-Communications *Nippon Bacharu Riariti Gakkai Taikai Ronbunshu (CD-ROM)* (*Proceedings of the Virtual Reality Society of Japan Annual Conference (CD-ROM)*), 2005 vol. 10th, p. 1A3-2 Language: Japanese.

Wireless network headphones Feb. 19, 2006 UTC United States English (United States) Nobuyuki Hayashi.

Testing and Evaluation of the Ceotronics Inc. Model TC 917 Wireless Headset (Final rept) Jones, A. E. Air Force Research Lab., Brooks AFB, TX. Human Effectiveness Directorate. Report No. AFRL-HE-BR-TR-2000-0014 , Feb. 2000 , 19p Language: English.

*Wireless Audio Communication Network for In-Vehicle Access of Infotainment Services in Motorcycles* Audino, D. Baronti, F. Roncella, R. Saletti, R. Dipartimento di Ingegneria dell';Informazione: Elettronica, Informatica, Telecomunicazioni—University of Pisa, via G. Caruso 16, 1-56122 Pisa, Italy This paper appears in: Personal, Indoor and Mobile Radio Communications, 2006 IEEE 17th International Symposium on Publication Date: Sep. 2006 on pp. 1-5 No. of pp. 1-5 Location: Helsinki Digital Object Identifier: 10.1109/PIMRC.2006.254000 Posted online: Dec. 11, 2006 09:17:24.0.

*VoIP call over WLAN with Bluetooth headset multiradio interoperability solutions* Palin, A. Honkanen, M. Nokia Res. Center, Tampere, Finland This paper appears in: Personal, Indoor and Mobile Radio Communications, 2005. PIMRC 2005. IEEE 16th International Symposium on Publication Date: Sep. 11-14, 2005 vol. 3 on pp. 1560-1564 vol. 3 No. of pp. 4 vol. (xxiv2809) INSPEC Accession No. 9006150 Digital Object Identifier: 10.1109/PIMRC.2005.1651706 Posted online: Jul. 24, 2006 08:55:10.0.

\* cited by examiner

WIRELESS AUDIO SHARING

FIELD OF THE INVENTION

The present invention relates generally to the field of wireless communications, and more particularly to wireless communication of audio among devices.

BACKGROUND OF THE INVENTION

Many prior art media devices can receive radio broadcasts from such sources such as FM, AM or satellite broadcasts. With respect to headphones, wireless headphones receive music from media devices via a variety of methods, such as infra-red transmission, 25 mhz radio or 2.4 ghz radio transmission technologies such as Bluetooth.

Media devices can transfer media files such as music and/or video files wirelessly between other similar media devices via similar methods as described above. The transferring of such files is usually from one storage medium to another.

Despite the advantages of the foregoing, wired headphones and/or earbuds suffer from limitations. Some such systems allow one user to share the music experience by passing one wired headphone or earbud to a third party. This shared experience, however, does not allow the third party to experience the full stereo experience of the music. Headphone adapter jacks exist for two wired headphones to be connected to the same media device but this also requires both users to be tethered close to the same media device.

Shared music by transfer of media files from one storage medium to other storage medium often infringe upon third party intellectual property rights.

Prior art wireless headphones do not allow users to share music from the same media device such as an MP3 player. Wireless headphones are also limited to the range of the wireless transmitter and users using wireless headphones cannot be too far from the source. Also, general transmission techniques such as Bluetooth are generally accessible to anyone having the capability to receive that data.

In view of the foregoing, a system and method are disclosed for wireless sharing of audio sounds among a plurality of users. A user of the present invention can communicate his or her audio sounds to other users, who can receive the audio sounds with the same invention. As such, an audio sound sharing network can be easily established at any time and any place. Potential advantages of the present invention include allowing users to share music wirelessly and in stereo, and further avoiding any potential infringement of third party intellectual property rights through the transfer of audio source files.

SUMMARY OF THE INVENTION

A digital audio player is presented which features wireless stereo communication to other devices within the network. The device or system of devices incorporates components to transmit and receive audio sounds wirelessly (including by radio, Bluetooth or infra-red technologies) by: (a) having a transmitter/receiver built in (e.g., a wireless transmitter/receiver built into a portable computing device or a digital media player); (b) having an intermediary device that is used to implement the transmission/reception (e.g., a "dongle" transmitter/reception, or a transmitter/receiving station); (c) having the intermediary device that is used to implement the transmission/reception built into the headphones (wired or wireless); or (d) using a similar device or devices to implement the transmission/reception. The audio signal can be selectively rebroadcast to other users.

BRIEF DESCRIPTION OF THE DRAWINGS

The foregoing and other advantages of the invention will become apparent upon reading the following detailed description and upon reference to the drawings, wherein.

Figure 1:
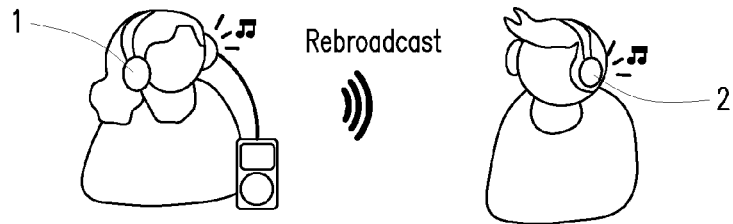
FIG. 1 illustrates a schematic view of a person sharing audio in accordance with one aspect of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF PREFERRED EMBODIMENTS

As set forth above, embodiments of the invention provide a system and method for wirelessly sharing an audio experience among a plurality of users. The system contemplates a plurality of devices, any one of which is able to transmit to one or more other device. This allows one or more user of a device to receive the appropriate audio sounds from the transmitting device, thereby creating an audio sound sharing network. Alternatively, the users of any of the receiving devices can also opt to set their device to transmit while aforementioned users of the transmitting devices can also opt to set their devices receive.

Dedicated and Broadcast Use

As shown in FIG. 1, the user of a device 1 can opt to only transmit a dedicated signal from 1 to another device 2; in this instance, device 2 will be the only receiving device for 1. 2 decodes the signal from 1 to provide the user of 2 with the appropriate/desired audio sounds. As used herein, the term "dedicated" is used to refer to a closed network, whereby only users of that network may have ready access to the decoding and/or decrypting technology to access the communicated signals. A "closed network" can refer to a network that employs proprietary technology that is not directly interoperable with other standards-based networks, or that adds an additional layer of encoding onto standards-based networks. A "closed network" also encompasses a private network that can only be used by authenticated or authorized devices; e.g., outsider use may be prohibited and enforced through cryptographic means. A closed network is thus distinct from an open network such as Bluetooth, whereby any device that is Bluetooth-enabled may (in the absence of proprietary encoding or encryption) receive and process that signal.

Figure 2:
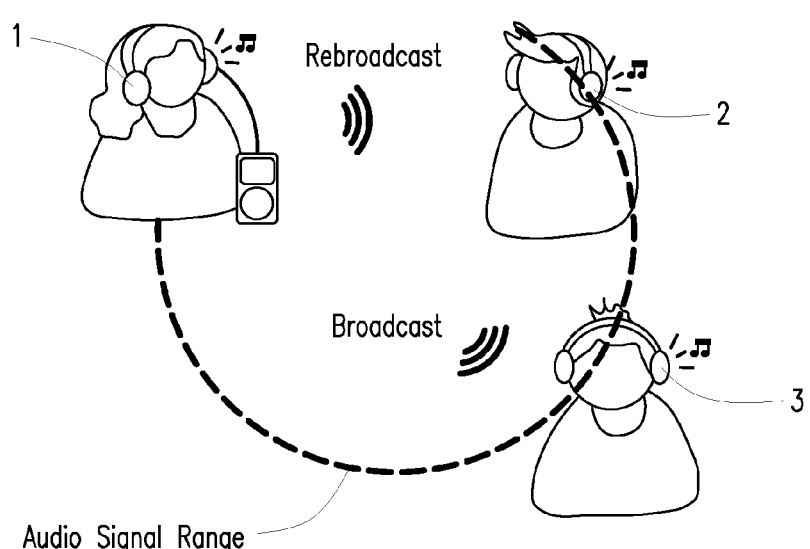
FIG. 2 illustrates a schematic view of a plurality of persons sharing audio from a single source in accordance with one aspect of the present invention.

Referring now to FIG. 2, a user of device 1 can opt to set 1 to broadcast. As such, enabled third parties in the range of transmission of 1, such as the user of a device 3 and potentially others, can opt to set their respective devices to receive from 1, or on a channel on which 1 is set to transmit. 3 and others can now decode the signal from 1 to provide the user of 3 and others with the appropriate/desired audio sounds.

Figure 3:
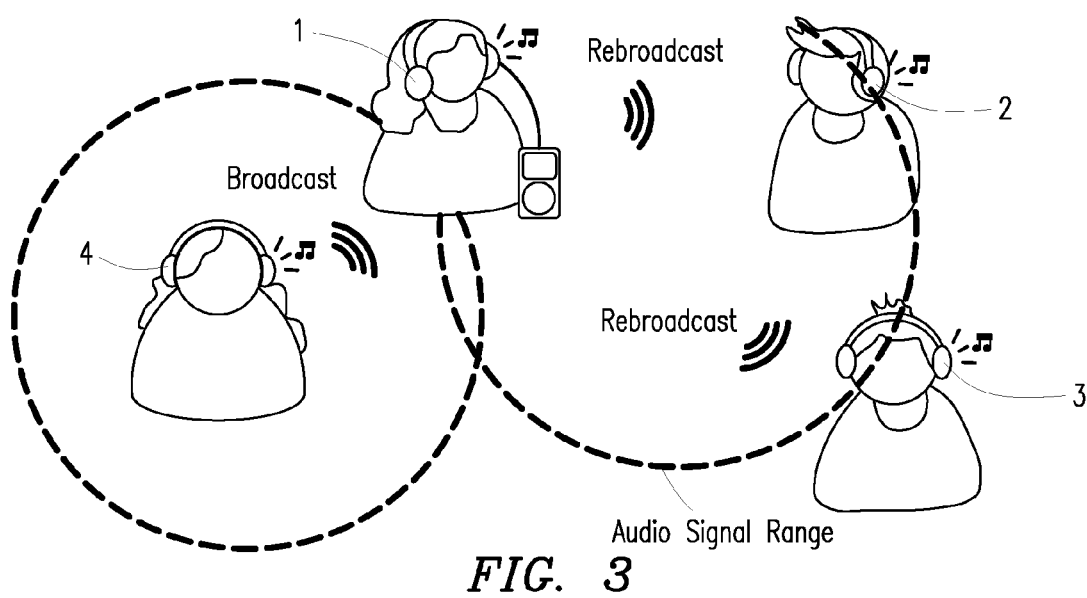
FIGS. 3 and 4 illustrate other embodiments of the invention in which a plurality of rebroadcasts occur.

As shown in FIG. 3, the user of 1 can also opt to set 1 to receive from other transmitting devices (e.g., 4) belonging to other users.

Rebroadcasting

Figure 4:
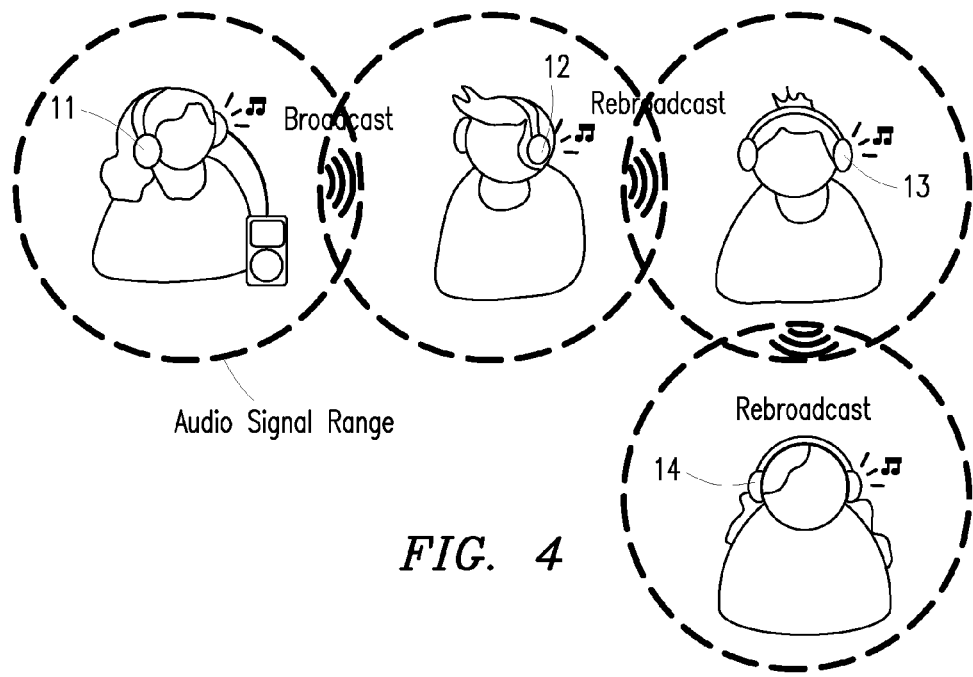

The system and method of the present invention can also be used in the context of re-broadcasting. For example, as shown in FIG. 4, with the user can set 11 on broadcast, the user of 12 which is receiving the audio sounds can opt to set 12 to receive the audio sounds from 11 and to simultaneously re-broadcast the same audio sounds to other users' devices (e.g., 13, 14, etc.). Rebroadcasting may be undertaken before or after decoding the signal; if the latter, the signal will be encoded prior to being retransmitted. The encoding may be the same as, or in some applications different from, the original encoding.

Rebroadcast thus allows user of 13 who is out of the range of 11 but in the range of the re-broadcast of 12 to receive the appropriate audio signals from 11, via 12.

Likewise, if the user of 13 opts to set 13 to re-broadcast, the user of 14, who is out of the range of the broadcast of 11 and the re-broadcast of 12, can opt to set 14 to receive the appropriate audio sounds from 14 via 12 and 13.

For all the applications above, the users of 12, 13 and 14 can also set their respective devices to receive the appropriate audio signals which are being re-broadcasted.

Figure 5:
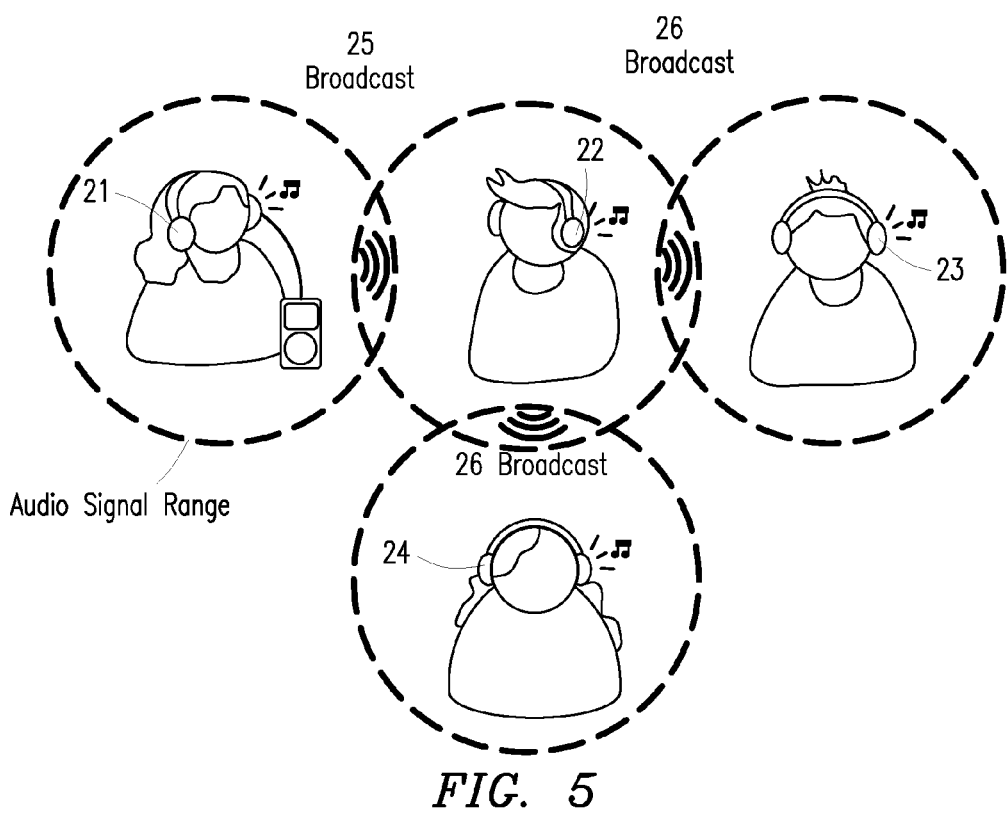
FIG. 5 illustrates another embodiment of the invention in which a plurality of broadcasts occur, and in which differing audio signals may be communicated among the various devices.

FIG. 5 depicts an alternative embodiment of the invention that enables use with the simultaneous reception and transmission/broadcast of different audio sounds. As shown in FIG. 5, the user of 21 sets 21 to transmit or broadcast a certain audio signal 25.

The user of 22 can set his device to receive the transmission/broadcast of AS 1 from 21. The user of 22 can simultaneously opt to set 22 to transmit or broadcast a different audio sound 26 on a different channel which can be received by users of 23, 24, etc, provided that they have set their respective devices to receive the transmission or broadcast of 26 on that channel from the user of 22.

This invention also enables use in multi-channel transmission or broadcast (simultaneous or otherwise). With multiple users transmitting in a limited range, the implementation of the wireless transmission may be made in dedicated channels which users may opt to receive either:

i. automatically via hunting and/or frequency hopping; or
  ii. manually by tuning to specific frequencies denoted by:
  a. discrete channels denoted by numbers (e.g., Channel 1, Channel 2, etc);
  b. discrete channels denoted with colors (e.g., Red, Green, Blue); or
  c. other methods consistent with those known to persons of skill in the art.

In order to identify the mode in which a device is operating (either transmitting, broadcasting, re-broadcasting or receiving), the user of a device can opt to set either cues on his device or cues to be displayed/received on third parties' device to allow third parties to identify the mode in which a device is operating. The cues could take various forms or combination of forms such as:

a. visual cues, including text, colored indicators or lights, which will indicate the various modes in which the device is operating; and
  b. sound cues which will indicate the various modes in which the device is operating. Such sounds can either be heard audibly or through use of the device).

(e.g., 21 is set to broadcast. 21 flashes a blue light which users of other Devices (22, 23, etc.) can see and then opt to set 22, 23, etc. to receive 21's broadcast.)

The foregoing discussion focuses principally on the sharing of music and other audio. It is understood, however, that other applications will also be useful. For example, the application could be used in a gaming environment, in which it is desired that a number of players share a similar audio experience. For example, all such members may be sharing a communications "channel" in the virtual environment. In addition, the present invention could be advantageously applied in the areas of education and training.

As noted above, while the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A system for sharing an audible experience comprising:
   a first headphones comprising:
   a first plurality of speakers;
   a first wireless transceiver; and
   a first control system for controlling said first wireless transceiver, the first control system adapted to selectively control a plurality of first control operations, the plurality of first control operations including at least two of:
   (i) a transmission of a first signal simultaneous with a generation of an audio playback corresponding to the first signal,
   (ii) a reception of a second signal comprising different information content than the first signal simultaneous with each of the transmission of the first signal and a generation of an audio playback corresponding to the second signal; and
   (iii) a reception and simultaneous retransmission of the second signal simultaneous with the generation of an audio playback corresponding to the first signal.

2. The system of claim 1, wherein said first headphones comprise a user interface to receive input from a user.

3. The system of claim 2, wherein said user interface includes a setting to opt to selectively play the audio playback corresponding to one of said first signal and said second signal.

4. The system of claim 3, wherein said user interface includes a setting to opt to retransmit said second signal.

5. The system of claim 4, where said retransmission of said second signal is on a designated channel selected using the user interface.

6. The system of claim 1, further comprising:
   a second headphones comprising:
   a second plurality of speakers;
   a second wireless transceiver; and
   a second control system for controlling said second wireless transceiver, the second control system adapted to selectively control a plurality of second control operations, the plurality of second control operations including:
   (i) a reception and simultaneous retransmission of one of the first signal and the second signal simultaneous with a generation of an audio playback corresponding to one of the first signal, the second signal, and a third signal comprising different information content than each of the first signal and the second signal; and (ii) a reception of one of the first signal and the second signal simultaneous with a generation of an audio playback corresponding to one of the one of the first signal and the second signal simultaneous with a transmission of the third signal.

7. The system of claim 6, wherein said second control system generates said audio playback corresponding to one of said first signal and second signal while transmitting said third signal to a third headphones.

8. The system of claim 1, wherein said transmission of one of the first signal and the second signal occurs on one of a plurality of discrete channels.

9. The system of claim 8, wherein said one of a plurality of discrete channels is selected automatically.

10. The system of claim 9, wherein said automatic selection occurs by hunting.

11. The system of claim 9, wherein said automatic selection occurs by frequency hopping.

12. The system of claim 8, wherein said one of a plurality of discrete channels is selected manually.

13. The system of claim 12, wherein said manual selection is denoted by numbers.

14. The system of claim 12, wherein said manual selection is denoted by colors.

15. The system of claim 8, wherein said one of a plurality of discrete channels is indicated by a visual cue.

16. The system of claim 8, wherein said one of a plurality of discrete channels is indicated by an audible cue.

17. The system of claim 1, wherein the first signal comprises a first audio signal and the second signal comprises a second audio signal corresponding to different audio sounds than the first audio signal.

18. An audio sharing network comprising:
a first playback system comprising:
  a first wireless transceiver;
  a first user interface responsive to user input; and
  a first control system for said first wireless transceiver adapted to selectively control in response to user input a plurality of first control operations including at least two of:
    (i) reception and playback of a first audio signal simultaneous with a retransmission of the first audio signal;
    (ii) reception and playback of the first audio signal simultaneous with a transmission of a second audio signal comprising different information content than the first audio signal; and
    (iii) reception and simultaneous retransmission of the first audio signal simultaneous with a playback of the second audio signal; and
a second playback system comprising:
  a second wireless transceiver;
  a second user interface responsive to user input; and
  a second control system for said second wireless transceiver adapted to selectively control in response to user input a plurality of second control operations including at least two of:
    (i) reception and playback of one of the first audio signal and the second audio signal simultaneous with a respective retransmission of one of the first audio signal and the second audio signal;
    (ii) reception and playback of one from the group of the first audio signal and the second audio signal simultaneous with a transmission of a third audio signal comprising different information content than each of the first audio signal and the second audio signal; and
    (iii) reception and simultaneous retransmission of one from the group of the first audio signal and the second audio signal simultaneous with a playback of the third audio signal.

19. The network of claim 18, wherein said second control system is adapted to allow a user to rebroadcast one from the group of said first audio signal and said second audio signal to a third playback system.

20. The network of claim 19, wherein said first control system is adapted to encrypt an audio signal before transmission, thereby generating an encrypted audio signal.

21. The network of claim 18, wherein said second control system is adapted to decode said a received audio signal.

22. A device peripheral comprising:
a controller;
a transceiver controllable by the controller for selectively performing a signaling operation selected from a plurality of signaling operations comprising each of receiving reception signals, transmitting transmission signals, and simultaneously receiving the reception signals and transmitting the transmission signals; and
a device interface couplable to a device for communicating with the controller and the device, the controller for selectively performing a communication operation via the device interface, the communication operation selected from a plurality of communication operations comprising each of transmitting first signals comprising first audio information to the device, receiving second signals comprising second audio information from the device, and simultaneously exchanging the first signals and the second signals with media data to the device, second media data to the device, and
wherein the controller is operable to selectively control one of simultaneous and separate performance of the signaling operation and the communication operation, the reception signals carrying one of the first signals and third signals, the third signals comprising information content distinct from the first signals, and the transmission signals carrying one of the first signals, the second signals, the third signals and fourth signals, the fourth signals comprising information content distinct from the first signals, the second signals, and the third signals.

23. The device peripheral of claim 22, wherein at least one of the first signals, the second signals, the third signals, and the fourth signals further comprises visual information.

24. The device peripheral of claim 22, wherein one of the first signals and the third signals is decoded from the reception signals.

25. The device peripheral of claim 22, wherein one of the first audio information, the second audio information, the third audio information, and the fourth audio information is encoded prior to being transmitted within the transmission signals.

26. The device peripheral of claim 22, wherein the second signals are derived from the first signals.

27. The device peripheral of claim 22, further comprising a user interface operable by a user for controlling at least one of the signaling operation and the communication operation.

28. The device peripheral of claim 27, wherein the user interface is further operable for selecting one of simultaneous and separate performance of the signaling operation and the communication operation.

29. The device peripheral of claim 22, wherein transmitting the transmission signals and receiving the reception signals occurs on one of a plurality of discreet channels.

30. The device peripheral of claim 29, wherein the one of a plurality of discreet channels is automatically selected.

31. The device peripheral of claim 30, wherein the automatic selection occurs by hunting.

32. The device peripheral of claim 30, wherein the automatic selection occurs by frequency hopping.

33. The device peripheral of claim 29, wherein the one of a plurality of discreet channels is selected manually.

34. The device peripheral of claim 33, further comprising a display for displaying numbers denoting the manual selection.

35. The device peripheral of claim 33, further comprising a display for displaying colors denoting the manual selection.

36. The device peripheral of claim 29, wherein the one of a plurality of discreet channels is indicated by a visual cue.

37. The device peripheral of claim 29, wherein the one of a plurality of discreet channels is indicated by an audible cue.

38. The device peripheral of claim 22, wherein the devices comprises a playback module for playback of at least one of the first audio information, the second audio information, the third audio information, and the fourth audio information.

39. The device peripheral of claim 22, wherein the device is at least one of a headphone, a media device and a wireless communication device.

40. The device peripheral of claim 22, wherein the device peripheral is a dongle.

41. The device peripheral of claim 22, wherein the first signals and the second signals comprise different information content.

42. The device peripheral of claim 22, wherein one of the first signals and the second signals comprises media data corresponding to at least one of audio information and visual information.

43. The device peripheral of claim 22, wherein each of the first signals, the second signals, the third signals, and the fourth signals comprises media data corresponding to at least one of audio information and visual information.

44. The device peripheral of claim 22, wherein at least two of the first signals, the third signals, and the fourth signals originate from different devices configured for wireless communication with the device peripheral.

45. The device peripheral of claim 22, wherein simultaneously exchanging the first signals and the second signals with the device comprises simultaneously transmitting the first signals to and receiving the second signals from the device.

46. The device peripheral of claim 22, wherein simultaneously exchanging the first signals and the second signals with the device comprises simultaneously transmitting the second signals to and receiving the first signals from the device.

47. The device peripheral of claim 22, wherein each of the signaling operation and the communication operation comprises wireless signal transfer.

48. The device peripheral of claim 47, wherein the second audio information corresponds to different audio sounds than the first audio information.

49. The device peripheral of claim 22, wherein each of the signaling operation and the communication operation comprises wireless signal transfer.

50. The device of claim 49, wherein the second audio information corresponds to different audio sounds than the first audio information.

51. A device comprising:
a controller;
a transceiver controllable by the controller for selectively performing a signaling operation selected from a plurality of signaling operations comprising each of receiving reception signals, transmitting transmission signals and simultaneously receiving the reception signals and transmitting the transmission signals;
a playback module; and
a data interface for communicating with the controller and the playback module, the controller for performing a communication operation via the data interface, the communication operation selected from a plurality of communication operations comprising each of transmitting first signals comprising first audio information to at least one other device, receiving second signals comprising second audio information from the at least one other device, and simultaneously exchanging the first signals and the second signals with the at least one other device, the playback module being operable for selective playback of one of the first signals and the second signals,
wherein the controller is operable to selectively control one of simultaneous and separate performance of the signaling operation and the communication operation, the reception signals carrying one of the first signals and third signals, the third signals comprising information content distinct from the first signals, and the transmission signals carrying one of the first signals, the second signals, the third signals and fourth signals, the fourth signals comprising information content distinct from the first signals, the second signals, and the third signals.

52. The device of claim 51, wherein one of the first signals, the second signals, the third signals, and the fourth signals further, comprises visual information.

53. The device of claim 51, wherein one of the first audio information and the third audio information is decoded from the reception signals.

54. The device of claim 51, wherein at least one of the first audio information, the second audio information, the third audio information, and the fourth audio information, is encoded prior to being transmitted within the transmission signals.

55. The device of claim 51, wherein second audio information is derived from the first audio information.

56. The device of claim 51, further comprising a user interface operable by a user for controlling at least one of the signaling operation and the communication operation.

57. The device peripheral of claim 56, wherein the user interface is further operable for selecting one of simultaneous and separate performance of the signaling operation and the communication operation.

58. The device of claim 51, wherein the transmitting transmission signals and receiving the reception signals occurs on one of a plurality of discreet channels.

59. The device of claim 58, wherein the one of a plurality of discreet channels is automatically selected.

60. The device of claim 59, wherein the automatic selection occurs by hunting.

61. The device of claim 59, wherein the automatic selection occurs by frequency hopping.

62. The device of claim 58, wherein the one of a plurality of discreet channels is selected manually.

63. The device of claim 58, wherein the one of a plurality of discreet channels is indicated by a visual cue.

64. The device of claim 58, wherein the one of a plurality of discreet channels is indicated by an audible cue.

65. The device of claim 56, further comprising a display for displaying numbers denoting the manual selection.

66. The device of claim 52, further comprising a display for displaying colors denoting the manual selection.

67. The device of claim 51, wherein the device is at least one of a headphone, a media device and a wireless communication device.

68. The device of claim 51, wherein the first signals and the second signals comprise different information content.

69. The device of claim 51, wherein one of the first signals and the second signals comprises media data corresponding to at least one of audio information and visual information.

70. The device of claim 51, wherein each of the first signals, the second signals, the third signals, and the fourth signals comprises media data corresponding to at least one of audio information and visual information.

71. The device of claim 51, wherein the first signals, the third signals, and the fourth signals originate from different devices.

72. The device of claim 51, wherein simultaneously exchanging the first signals and the second signals with the at least one other device comprises simultaneously transmitting the first signals to and receiving the second signals from the at least one other device.

73. The device of claim 51, wherein simultaneously exchanging the first signals and the second signals with the at least one other device comprises simultaneously transmitting the second signals to and receiving the first signals from the at least one other device.

* * * * *